(12) United States Patent
Fazl Ersi et al.

(10) Patent No.: US 9,940,506 B2
(45) Date of Patent: Apr. 10, 2018

(54) SYSTEM AND METHOD FOR FACE RECOGNITION

(71) Applicants: Ehsan Fazl Ersi, Toronto (CA); John Konstantine Tsotsos, Richmond Hill (CA)

(72) Inventors: Ehsan Fazl Ersi, Toronto (CA); John Konstantine Tsotsos, Richmond Hill (CA)

( * ) Notice: Subject to any disclaimer, the term of this patent is extended or adjusted under 35 U.S.C. 154(b) by 157 days.

(21) Appl. No.: 15/038,812

(22) PCT Filed: Nov. 24, 2014

(86) PCT No.: PCT/CA2014/051117
§ 371 (c)(1),
(2) Date: Nov. 4, 2016

(87) PCT Pub. No.: WO2015/074157
PCT Pub. Date: May 28, 2015

(65) Prior Publication Data
US 2016/0379043 A1    Dec. 29, 2016

Related U.S. Application Data

(60) Provisional application No. 61/908,212, filed on Nov. 25, 2013.

(51) Int. Cl.
*G06K 9/00* (2006.01)
*G06K 9/46* (2006.01)
(52) U.S. Cl.
CPC ..... *G06K 9/00288* (2013.01); *G06K 9/00268* (2013.01); *G06K 9/00281* (2013.01); *G06K 9/4642* (2013.01)

(58) Field of Classification Search
CPC .......... G06K 9/00288; G06K 9/00268; G06K 9/00281; G06K 9/4642
See application file for complete search history.

(56) References Cited

U.S. PATENT DOCUMENTS

| | | | | |
|---|---|---|---|---|
| 2010/0303354 A1* | 12/2010 | Reznik | ................. | G06K 9/4642 382/168 |
| 2011/0194772 A1* | 8/2011 | SanJuan | ............... | G06K 9/4671 382/190 |
| 2012/0182442 A1* | 7/2012 | Kirsch | ............... | H04N 5/23229 348/222.1 |
| 2014/0172643 A1* | 6/2014 | Fazl Ersi | ............. | G06K 9/4642 705/26.64 |

(Continued)

OTHER PUBLICATIONS

Moreno, Plinio, Alexandre Bernardino, and José Santos-Victor. "Improving the SIFT descriptor with smooth derivative filters." Pattern Recognition Letters 30.1 (2009): 18-26.*

(Continued)

*Primary Examiner* — Jonathan S Lee
(74) *Attorney, Agent, or Firm* — Bhole IP Law; Anil Bhole

(57) ABSTRACT

A system and method for generating a descriptor for a face is provided. The descriptor is operable to generate information about a given region in a face image to enable face recognition. The descriptor provided herein is a low dimension relative to many existing descriptors providing similar face recognition accuracy. In another aspect, a system and method for face recognition is provided.

18 Claims, 5 Drawing Sheets

(56) References Cited

U.S. PATENT DOCUMENTS

2015/0016668 A1* 1/2015 Cheriyadat ........ G06K 9/00637
382/103
2016/0203384 A1* 7/2016 Richmond ........... G06K 9/4642
382/170

OTHER PUBLICATIONS

Brown, Matthew, Gang Hua, and Simon Winder. "Discriminative learning of local image descriptors." IEEE transactions on pattern analysis and machine intelligence 33.1 (2011): 43-57.*
Bosch A, Zisserman A and Munoz X (2008) Scene classification using a hybrid generative/discriminative approach. IEEE Transaction on Pattern Analysis and Machine Intelligence 30(4): 712-727.
Fazl-Ersi E, Elder JH and Tsotsos JK (2009) Hierarchical appearance based classifiers for qualitative spatial localization. In: proceedings of the international conference on intelligent robots and systems, pp. 3987-3992.
Chang C and Lin C (2001) LIBSVM : a library for support vector machines. Software available at: http://www.csie.ntu.edu.tw/~cjlin/libsvm. Cristianini N, Shawe-Taylor J, Elisseeff A, et al. (2002) On kerneltarget alignment. Advances in Neural Information Processing Systems 14(14): 367-373.
Fazl-Ersi E and Tsotsos JK (2010) Energy minimization via graph cuts for semantic place labeling. In: proceedings of the international conference on intelligent robots and systems, pp. 5947-5952.
Fei-Fei L and Perona P (2005) A bayesian hierarchical model for learning natural scene categories. In: proceedings of the IEEE conference on computer vision and pattern recognition, pp. 524-531.
Freund Y and Schapire R (1995) a decision-theoretic generalization of on-line learning and an application to boosting. In: proceedings of the second European conference on computational learning theory, pp. 23-37.
Friedman S, Hanna P and Fox D (2007) Voronoi random fields: ext racting topological structure of indoor environments via place labeling. In: proceedings of the international joint conference on artificial intelligence, pp. 2109-2114.
Galindo C, Saffiofti A, Coradeschi S, et al. (2005) Multihierarchical semantic maps for mobile robotics. In: proceedings of the international conference on intelligent robots and systems, pp. 2278-2283.
Hubel DH and Wiesel TN (1968) Receptive fields and functional architucture of monkey striate cortext. Journal of Physiology 195(1): 215-243. Downloaded from ijr.sagepub.com at York Univ Libraries on Jun. 9, 2012.
Fazl-Ersi and Tsotsos 483 Lagarias JC, Reeds JA, Wright MH, et al. (1998) Convergence properties of the Nelder-Mead simplex method in low dimensions. SIAM Journal of Optimization 9(1): 112-147.
Lazebnik S, Schmid C and Ponce J (2006) Beyond bags of features: Spatial pyramid matching for recognizing natural scene categories. In proceedings of the IEEE international conference on computer vision and pattern recognition, pp. 2169-2178.
Liu J and Shah M (2007) Scene modeling using co-clustering. In: proceedings of the IEEE international conference on computer vision.
Lowe DG (2004) Distinctive image features from scale-invariant keypoints. International Journal of Computer Vision 60 (2): 91-110.
Martinez-Mozos O and Burgard W (2006) Supervised learning of topological maps using semantic information extracted from range data. In: proceedings of the international conference on intelligent robots and systems, pp. 2772-2777.
Martinez-Mozos O, Stachniss C and Burgard W (2005) Supervised learning of places from range data using Adaboost. In: proceedings of the international conference on robotics and automation.
Ojala T, Pietikainen M and Harwood D (1996) A comparative study of texture measures with classification based on feature distribution. Journal of Pattern Recognition 29(1): 51-59.
Ojala T, Pietikainen M and Maenpaa T (2002) Multiresolution gray-scale and rotation invariant texture classification with local binary patterns. IEEE Transactions on Pattern Analysis and Machine Intelligence 24(7): 971-987.
Oliva A and Torralba A (2001) Modeling the shape of the scene: A holistic representation of the spatial envelope. International Journal of Computer Vision 42(3): 145-175.
Pronobis A, Caputo B, Jesfelt P, et al. (2006) A discriminative approach to robust visual place recognition. In: proceedings of the international conference on robots and systems, pp. 3829-3836.
Pronobis A, Martinez-Mozos O and Caputo B (2008) SVM-based discriminative accumulation scheme for place recognition. In: proceedings of the IEEE international conference on robotics and automation, pp. 522-529.
Ranganathan A (2010) PLISS: Detecting and labeling places using online change-point detection. In: proceedings of the robotics: Science and systems.
Renniger L and Malik J (2004) When is scene identification just texture recognition? Journal of Vision Research 44 (19):2301-2311.
Rottmann A, Martinez-Mozos O, Stachniss C, et al. (2005) Semantic place classification of indoor environments with mobile robots using boosting. In: proceedings of the national conference on artificial intelligence, pp. 1306-1311.
Siagian C and Itti L (2007) Rapid biologically-inspired scene classification using features shared with visual attention. IEEE Transactions on Pattern Analysis and Machine Intelligence 29(2): 300-312.
Torralba A (2003) Contextual primming for object detection. International Journal of Computer Vision 53(2): 169-191.
Torralba A, Murphy KP, Freeman WT, et al. (2003) Context-based vision system for place and object recognition. In: proceedings of the IEEE international conference on computer vision, p. 273.
Vasudevan S, Gachter S, Nguyen VT, et al. (2007) Cognitive maps for mobile robots—an object based approach. Robotics and Autonomous Systems 55(5): 359-371.
Viola P and Jones M (2001) Rapid object detection using a boosted cascade of simple features. In: proceedings of the IEEE international conference on computer vision and pattern recognition, pp. 511-518.
Viswanathan M, Siagian C and Itti L (2008) Comparison of Gist models in rapid scene categorization tasks.
Vision Sciences Society meeting. Available at: http://ilab.usc.edu/siagian/Research/Gist/Viswanathan_etal_VSS08.pdf.
Whitehead S and Ballard D (1991) Learning to perceive and act by trial and error. Journal of Machine Learning 7(1): 45-83.
Wolf L, Hassner T and Taigman Y (2009) the one-shot similarity kernel. In: proceedings of the IEEE international conference on computer vision.
Wu J, Christensen H and Rehg JM (2009) Visual place categorization: Problem, dataset, and algorithm. In: proceedings of the international conference on intelligent robots and systems.
Wu J and Rehg JM (2011) CENTRIST: A visual descriptor for scene categorization. IEEE Transactions on Pattern Analysis and Machine Intelligence 33(8): 1489-1501.
Zender H, Martinez-Mozos O, Jensfeltc P, et al. (2008) Conceptual spatial representations for indoor mobile robots. Robotics and Autonomous Systems 56(6): 493-502.
Zhou X, Cui N, Li Z, et al. (2009) Hierarchical Gaussianization for image classification. In: proceedings of the IEEE international conference on computer vision, pp. 1971-1977. Downloaded from ijr.sagepub.com at York Univ Libraries on Jun. 9, 2012.

* cited by examiner

SYSTEM AND METHOD FOR FACE RECOGNITION

TECHNICAL FIELD

The following is related generally to image recognition and more specifically face recognition in an image.

BACKGROUND

A wide range of applications can benefit from face recognition. Among such applications identity verification, logon interfaces, video indexing, and speaker verification are of particular interest. Face retrieval and ranking are other interesting applications of face recognition technology, since they could be used to efficiently organize, categorize, tag and manage large sets of digital images, based on the people who are present in them.

SUMMARY

In one aspect, a method of generating a texture-encoding descriptor for an image region is provided, the method comprising: (a) filtering the image region by applying a derivative of a base filter to the image region to generate a response vector for each pixel in the image region; (b) determining a proximity of each response vector to each of a set of base orientations and a magnitude of each response vector; (c) determining an association of each response vector to each of the base orientations based on the proximity, the magnitude and a significance of the location within the image region from which the response vector was generated; and (d) aggregating the associations of each response vector in the image region to each of the base orientations to generate the descriptor.

In another aspect, a texture-encoding descriptor generator for an image region is provided, the descriptor generator comprising: (a) a filter configured to apply a derivative of a base filter to the image region to generate a response vector for each pixel in the image region; and (b) a processor and memory, the memory having instructions encoded thereon which when executed by the processor cause the processor to: (i) determine a proximity of each response vector to each of a set of base orientations and a magnitude of each response vector; (ii) determine an association of each response vector to each of the base orientations based on the proximity, the magnitude and a significance of the location within the image region from which the response vector was generated; and (iii) aggregate the associations of each response vector in the image region to each of the base orientations to generate the descriptor.

In a further aspect, a method for classifying a probe face image is provided, the method comprising: (a) producing a representation for the face image from a plurality of texture-encoding descriptors extracted from one or more informative locations of the face image; (b) generating scores by comparing the representation of the face image against correspondingly produced representations of further face images stored in a gallery database, based on models learned using Probabilistic Linear Discriminant Analysis (PLDA) or Support Vector Machine (SVM) learning algorithms; and (c) identifying a match, if any, from the gallery database to the probe face by analyzing the scores computed by the learned models.

In an additional aspect, a system for recognizing a probe face image, comprising: (a) a descriptor generation module configured to produce a representation for the face image from a plurality of texture-encoding descriptors extracted from one or more informative locations of the face image; and (b) a similarity analyzing module configured to: (i) generate scores by comparing the representation of the face image against correspondingly produced representations of further face images stored in a gallery database, based on models learned using Probabilistic Linear Discriminant Analysis (PLDA) or Support Vector Machine (SVM) learning algorithms; and (ii) identify a match, if any, from the gallery database to the probe face by analyzing the scores computed by the learned models.

These and other aspects are contemplated and described herein. It will be appreciated that the foregoing summary sets out representative aspects of systems and method for face recognition to assist skilled readers in understanding the following detailed description.

DESCRIPTION OF THE DRAWINGS

A greater understanding of the embodiments will be had with reference to the Figures, in which.

DETAILED DESCRIPTION

Figure 1:
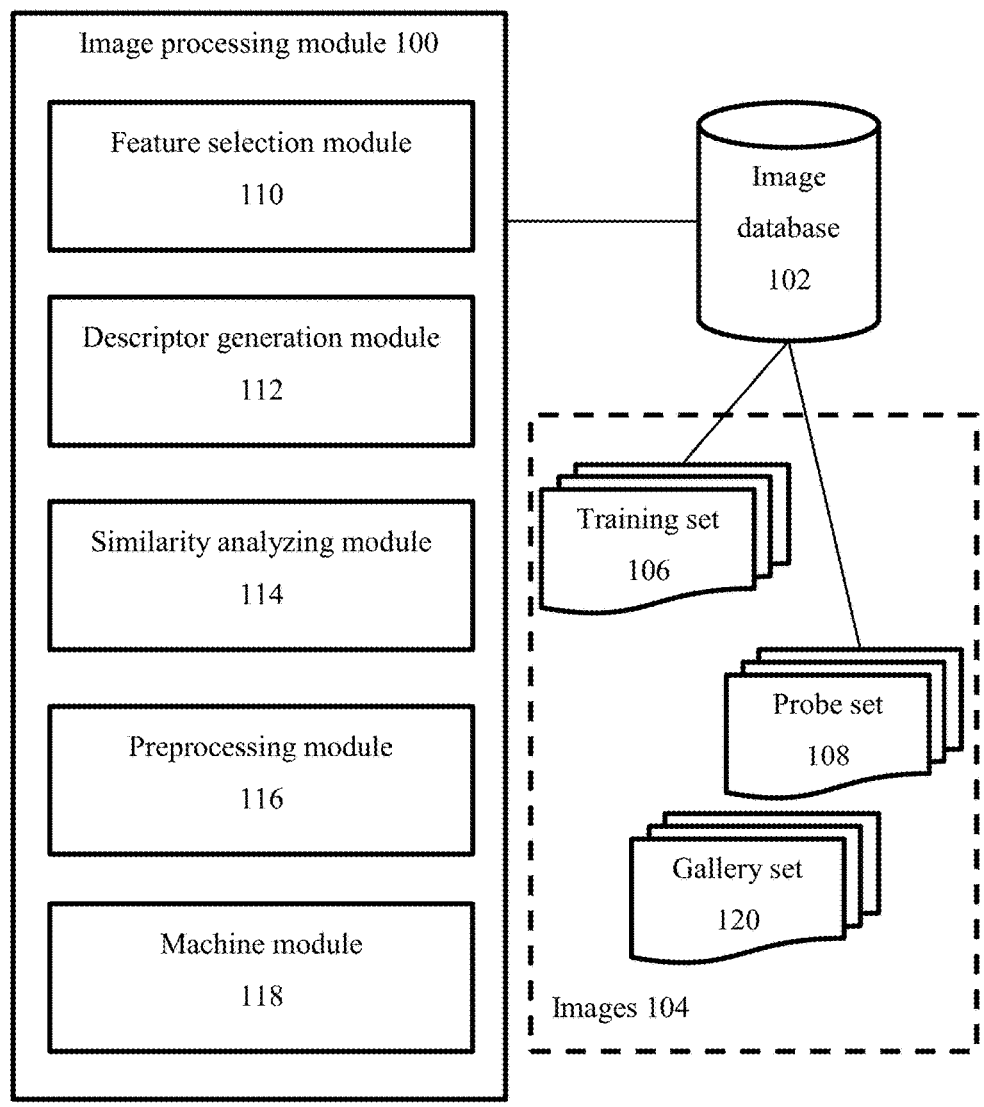
FIG. 1 is a block diagram of an image processing system.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

It will be appreciated that various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

It will be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

In the following description, the term "image" is used to indicate a digital representation of a scene which might include an individual's face. The scene may additionally comprise an object, collection of objects, human physical traits other than the face, and other physical manifestations that may not necessarily be relevant to the individual's face. Furthermore, the term "face image" is used to indicate a region of the image that bounds an individual's face, whether aligned to a canonical coordinate frame for upfront viewpoint, or unaligned, as it might appear in the image.

The following provides a new image descriptor particularly suitable for but not limited to enabling face recognition. The descriptor has low dimensionality relative to many existing descriptors providing similar or lesser face recognition accuracy. In accordance with the following, each face image can be represented by a plurality of the descriptors described herein, where the number of such descriptors is determined by the number of facial feature regions considered most relevant and, therefore, considered in the face recognition. The particular feature regions to be selected can be determined using a feature selection technique of the prior art. Exemplary techniques are provided by Vidal-Naquet and Ullman (2003, *Object Recognition with Informative Features and Linear Classification, Proceedings of the International Conference on Computer Vision*), and Fazl-Ersi and Tsotsos (2012, *Histogram of Oriented Uniform Patters for Robust Place Recognition and Categorization, The International Journal of Robotics*), as described further herein.

The descriptor for any given feature region is generated based on response vectors generated for each pixel within the region, where the response vectors are computed from filtering the image region with the derivatives of a base filter. The proximity of each response vector to each of a plurality of predetermined base angles, the magnitude of each response vector, and the significance of each response vector based on the location it was generated from, are then combined in a principled way to form the descriptor. The descriptors for a particular probe face image can then be compared to those of the existing gallery face images, for the purpose of matching and/or recognition.

The dimensionality of the descriptor is determined by the number of base angles considered in the generation of the descriptor. In the following description, eight such base angles are used. These correspond to the angles $\{0°, 45°, 90°, 135°, 180°, 225°, 270°, 315°\}$. However, any number of base angles could be selected depending on the desired trade-off between dimensionality and accuracy of face recognition. Further, it is not strictly required that the selected angles are spaced evenly apart.

In accordance with the foregoing, in one aspect, a system and method for generating a descriptor for an image region is provided. The descriptor is operable to generate information about the face image to enable face recognition. The descriptor provided herein has low dimensionality relative to many existing descriptors providing similar or lower face recognition accuracy. For example, it may be possible to represent a face image by less than 1000 8-dimensional descriptors described herein with comparable accuracy to 2900 128-dimensional SIFT descriptors.

In another aspect, a system and method for face recognition is provided.

Referring now to FIG. 1, an exemplary system is shown in which the descriptor described herein can be generated and used in the context of face recognition. It will be appreciated that the descriptor can be generated and be useful in systems other than the system described herein. Examples of such systems are object detection (particularly, face and pedestrian/people detection), pattern recognition and classification, face gender recognition, face age classification, and facial expression classification.

An image processing module 100 is communicatively linked to an image database 102. The image database 102 stores a plurality of images 104 comprising a training set 106. The images 104 may further comprise a probe set 108. The images 104 may further comprise a gallery set 120. The probe set 108 comprises probe face images depicting face images for which face recognition is desired, while the gallery set 120 comprises face images for which the identity of depicted faces are known, and are to be used to infer the unknown identity of the face images in the probe set. The training set 106 comprises face images for which the identity of depicted faces are known, and are to be used for feature selection and/or to learn face recognition models. There is preferably no overlap between the images and/or identities of the gallery set 120 and the training set 106. Recognition can be understood as having linked a probe face to some index in the gallery set, be it a person's name, alphanumeric index for a gallery face, the specific descriptors for a gallery face, or a hash or transformation of any of the above. The indices may be stored in the image database along with the images, or can be stored in the image files themselves, as further described herein.

Figure 4:
FIG. 4 is a set of images depicting a first common individual.
Figure 5:
FIG. 5 is a set of images depicting a second common individual.

Two examples of images from the LFW database, provided by Huang et al. (2007, *Labeled Faces in the Wild: A Database for Studying Face Recognition in Unconstrained Environments, University of Massachusetts, Amherst, Technical Report*), that are appropriate for the gallery set or query set are shown in FIGS. 4 and 5. In the examples, two individuals' faces are shown at slightly various viewpoints with various backgrounds, shading and ancillary objects (e.g., hairstyle, head coverings/hats, jewellery, print on backgrounds, clothing, etc.). The following is operable to generate descriptors for such faces sufficient to enable the grouping and recognition of common faces. That is, faces shown in images of FIG. 4 can be matched to other faces as shown in FIG. 4, and similarly for the faces shown in images of FIG. 5.

The image processing module 100 comprises, or is linked to, a feature selection module 110, descriptor generation module 112 and similarity analyzing module 114. In additional implementations, the image processing module 100 may further comprise or be linked to a preprocessing module 116, a machine module 118 or both.

The image processing module 100 implements an image processing process that can be applied for training and recognition. Training may comprise the identification of one or more regions of the training images that are most informative in terms of face recognition. In particular implementations, the training may further comprise the learning by the machine module to perform recognition (i.e., on the probe set). Recognition determines the identity of the face in a probe image based on an analysis of the informative regions of the image.

Figure 2:
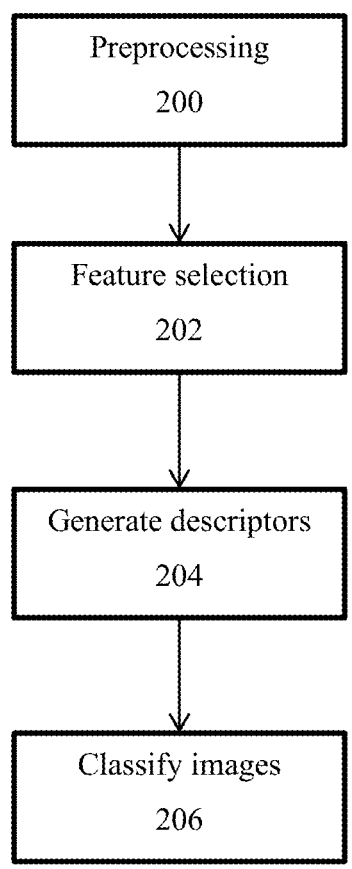
FIG. 2 is a flowchart representation of an image processing process.

Referring now to FIG. 2, the image processing process may comprise, in some implementations as will be described herein, the preprocessing module 116 performing preprocessing on an image at block 200. For example, in certain examples, color images may be converted to greyscale or the contrast or illumination level of the image may be normalized.

At block 202, the image processing module 100 directs the feature selection module 110 to perform feature selection. Feature selection enables the identification of one or more regions of the images that are most informative (i.e., indicative of the face recognition), for subsequent purposes comprising the representations of the training, gallery and probe images.

The system and method described herein do not require any specific technique for performing feature selection. Preferably, however, unlike prior techniques which use trial-and-error heuristics to determine arbitrary constants for implementation parameters (e.g., the size and location of the features), the feature selection module 110 applies feature selection so that only the descriptors generated for the most informative image regions contribute to the face representation.

Unlike many prior art approaches which apply fixed subdivision schemes to subdivide an entire face image into non-overlapping regions, and represent the face by combining the descriptors extracted from the resulting regions, in the following, the face images may be represented through a relatively sparse set of N features $F=\{ft_n|n\epsilon[1, N]\}$, covering only the most significant regions of the face, which may help to achieve relatively greater robustness against partial occlusion and non-uniform lighting variations.

It has been found that the feature selection technique described in Vidal-Naquet and Ullman, incorporated herein by reference, is suitable. The feature selection module implements the feature selection technique iteratively and in a greedy fashion, preferably adding additional features until the addition does not significantly increase the estimated information content of the set of selected features.

It has also been found that the feature selection technique in Fazl-Ersi and Tsotsos, incorporated herein by reference, is suitable. The feature selection module identifies the features whose similarity kernels (computed from pairs of training face images) have the highest alignment to the target kernel (generated by identifying the commonality of classifications of pairs of training face images).

Applying this technique, each feature ft may be represented by a triplet (ft.x, ft.y, ft.s) that specifies a region in the image, where ft.x and ft.y describe the location of the feature region and ft.s describes the size of the feature region. In a specific example, ft.x and ft.y correspond to the center of the region while ft.s corresponds to half the height and width of the region, such that feature region (ft.x, ft.y, ft.s) is bounded by top-left corner (ft.x−ft.s, ft.y−ft.s) and bottom-right corner (ft.x+ft.s, ft.y+ft.s).

Alternatively, ft may represent a circular region, where ft.x and ft.y describe the center of the feature region and ft.s describes the radius of the feature region.

In block 204, an image classification process comprises directing the descriptor generation module 112 to generate a descriptor for each of the selected features ft of the image. The dimensionality of the descriptor is preferably kept substantially small to optimize (minimize) processing load while remaining suitable to provide an appropriate accuracy level for face recognition.

The descriptor is generated for each feature as an aggregation of certain characteristics of each pixel within the feature region. For each such region, the descriptor encodes the textural properties of the local neighbourhood of pixels by aggregating the magnitude of their filtered responses towards various orientations. For this reason, a suitable nomenclature for the descriptor is "Texel", though other terms may of course be used.

Consequently, the dimensionality of the descriptor is determined by the number of orientations considered in its computation. In a straightforward implementation, the dimensionality of the descriptor is equal to the number of such orientations.

In an example implementation, the number of such orientations is 8, which correspond to the angles 0°, 45°, 90°, 135°, 180°, 225°, 270° and 315°. However, different angles and different numbers of angles could be selected.

Figure 3:
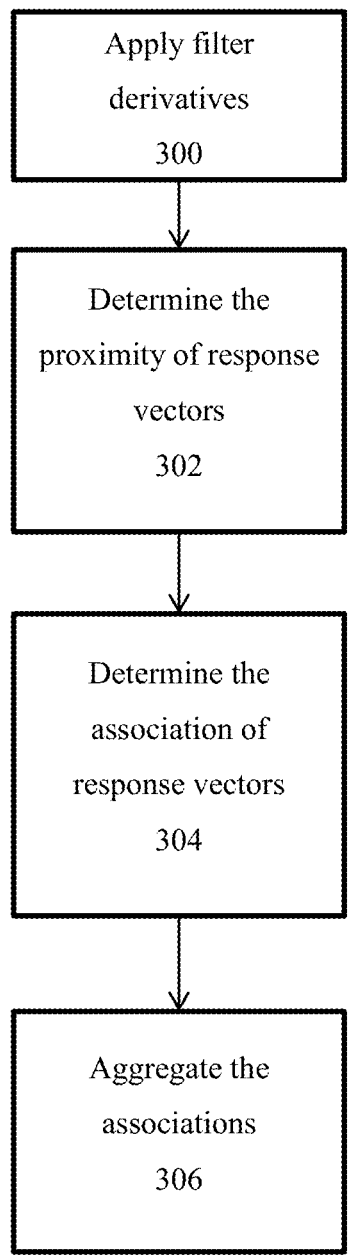
FIG. 3 is a flowchart representation of descriptor generation process.

Referring now to FIG. 3, at block 300, for feature region (ft.x, ft.y, ft.s) bounded by top-left corner (ft.x−ft.s, ft.y−ft.s) and bottom-right corner (ft.x+ft.s, ft.y+ft.s), the region is filtered for texture enhancement and discrimination, using the derivatives of a base filter with respect to the vertical direction (represented by baseKernel.X) and the horizontal direction (represented by baseKernel.Y), producing vertical and horizontal response maps for the feature region comprising all pixels therein.

In an example embodiment, the base filter may apply the mean of Gabor filters tuned to similar frequency but various orientations.

In another embodiment, the base filter may apply a pillbox filter.

In yet another embodiment, the base filter may apply a Laplacian of Gaussian filter.

For each pixel in the feature region, a response vector is generated from its horizontal and vertical filter responses.

At blocks 302 and 304, the contribution of each pixel in the feature region towards the descriptor of the entire feature region is determined based on the proximity and the association of the pixel's response vector to a set of pre-specified base orientations.

At block 302, the direction of the response vector for each pixel in the feature region $\{(i,j)|i\epsilon$ (ft.y−ft.s, ft.y+ft.s),$j\epsilon$ (ft.x−ft.s, ft.x+ft.s)$\}$ is evaluated in respect of its proximity to each of the base orientations (the angles previously selected), as follows:

$$\text{angularProximity}_{i,j} = \{(\cos(\theta) \times \cos(\alpha) + \sin(\theta) \times \sin(\alpha))^\rho | \forall \alpha \epsilon \text{angles}\}$$

where θ is the direction of the given pixel and ρ is a positive constant selected to enhance the proximity values.

At block 304, the association of each pixel (i,j) to each element (each of the angles) of the descriptor is computed, as follows:

pixelAssociation$_{i,j}$={weights$_{i,j}$×angularProximity$_{i,j}$<sup>n</sup>× M|∀n∈angles} where M is the magnitude of the response vector of the given pixel and weights indicates the significance of each pixel in the computation of the description vector.

In an example embodiment, the matrix weights may be defined using a rotationally symmetric Gaussian low-pass filter of the same size as the feature region.

At block 306, the associations of all pixels in the feature region to each base orientation are aggregated to produce the descriptor, as follows:

$$descriptor = \left\{ \sum_{i=ft.y-ft.s}^{ft.y+ft.s} \sum_{j=ft.x-ft.s}^{ft.x+ft.s} pixelAssociation_{i,j}^n \mid \forall n \in angles \right\}$$

In a particular embodiment, the extracted descriptors are normalized to sum to 1.

As will be appreciated, the dimensionality of the descriptor can be increased or decreased, as desired, by selecting greater or lesser base angles, respectively.

Each face image is represented by a collection of descriptors extracted from the regions specified by the set of selected informative features.

In a particular embodiment, the similarity between each pair of face images is measured by the weighted sum of the individual similarities computed between their corresponding descriptors. The weight of each feature may be determined according to its importance (e.g., features at key facial landmarks such as eyes may be given greater weight than features at, say, the forehead).

In another particular embodiment, the representations and identities of a large set of training face images are used to learn within-class and between-class subspaces using the Linear Discriminant Analysis (LDA) or Probabilistic Linear Discriminant Analysis (PLDA). These learned subspaces are then used to compare the representation of a probe face with those of the gallery faces to recognize the identity of the probe face.

In another particular embodiment, the representations of a set of training positive and negative pairs of faces (where a pair of faces is positive when the two faces belong to the same individual, and is negative, when the two faces belong to different individuals) are used to learn a model for distinguishing between similar and different faces, using the Support Vector Machine (SVM) learning method. The learned model is then used to compare the representation of a probe face against those of the gallery faces to recognize the identity of the probe face.

The image processing module is operable to perform the recognition process to match a query face with one of the faces represented in the gallery set. For any particular probe face image, the descriptor generation module can be used to generate descriptors for the informative regions determined during the training. In a particular implementation, these descriptors are provided to the machine module for recognition. As with the training images, the preprocessing module 116 may perform preprocessing on the gallery and probe face images.

Alternatively, probe images can be compared for similarity and grouping to other images in the probe set.

It will be appreciated that the low dimensionality of the descriptors and the possibility of their implementation through MAC (multiply-accumulate) operations, make them particularly useful for integration into embedded systems, where in most cases only integer variables and operations can be used with relatively small memory.

It will further be appreciated that the invention can be used within hardware systems, software systems or both in combination. Hardware systems can leverage the image processing module as an embedded module that offers computer vision capabilities for a computer system. This embedded module can be used in applications such as, but not limited to: smart sensors, smart cameras, smart phones, mobile tablets, compact vision systems, machine vision cameras, graphics processing units or as a software development kit that enables a hardware resource to leverage the image processing module's processes.

In one embodiment, this embedded module could be used within the automotive market for face recognition in motor vehicles. Specifically, the embedded module can enhance security features such as keyless entry, driver monitoring applications and driver interaction applications.

In another embodiment, this embedded module could be used in the robotics industry for humanoid robots that interact with humans.

In another embodiment, this embedded module could be used in the security industry for network cameras, network video recorders, digital video recorders and intelligent appliances.

In another embodiment, this embedded module could be used in consumer electronics such as set-top boxes, smart televisions, personal computers, appliances, smartphones, tablets and other mobile digital devices.

The image processing module can also be leveraged within software systems through the use of a software development kit, application programming interface or other software development libraries. Specifically, video analytic software can leverage the image processing module in order to track and recognize faces for the above-listed embodiments.

It will be appreciated that any of the foregoing examples may be applied to video images or still images.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A method of generating a texture-encoding descriptor for an image region comprising:
   a) filtering the image region by applying a derivative of a base filter to the image region to generate a response vector for each pixel in the image region;
   b) determining a proximity of each response vector to each of a set of base orientations and a magnitude of each response vector;
   c) determining an association of each response vector to each of the base orientations based on the proximity, the magnitude and a significance of the location within the image region from which the response vector was generated; and
   d) aggregating the associations of each response vector in the image region to each of the base orientations to generate the descriptor.

2. The method of claim 1, wherein the descriptor has a dimensionality corresponding to the number of base orientations.

3. The method of claim 2, wherein the number of base orientations is eight.

4. The method of claim 3, wherein the base orientations are evenly spaced apart at 45° increments.

5. The method of claim 1, further comprising preprocessing the image region prior to the filtering.

6. The method of claim 5, wherein the preprocessing comprises at least one of conversion to greyscale, contrast normalization and illumination normalization.

7. The method of claim 1, wherein the descriptor encodes textural property of the image region.

8. The method of claim 1, wherein the base filter comprises any one of: a Gabor filter, a pillbox filter and a Laplacian of a Gaussian filter.

9. The method of claim 1, wherein the significance is determined using a rotationally symmetric Gaussian low-pass filter of the same size as the image region.

10. A texture-encoding descriptor generator for an image region, the descriptor generator comprising:
   a) a filter configured to apply a derivative of a base filter to the image region to generate a response vector for each pixel in the image region; and
   b) a processor and memory, the memory having instructions encoded thereon which when executed by the processor cause the processor to:
      i. determine a proximity of each response vector to each of a set of base orientations and a magnitude of each response vector;
      ii. determine an association of each response vector to each of the base orientations based on the proximity, the magnitude and a significance of the location within the image region from which the response vector was generated; and
      iii. aggregate the associations of each response vector in the image region to each of the base orientations to generate the descriptor.

11. The descriptor generator of claim 10, wherein the descriptor has a dimensionality corresponding to the number of base orientations.

12. The descriptor generator of claim 11, wherein the number of base orientations is eight.

13. The descriptor generator of claim 12, wherein the base orientations are evenly spaced apart at 45° increments.

14. The descriptor generator of claim 10, further comprising or linked to a preprocessor for preprocessing the image region prior to the filtering.

15. The descriptor generator of claim 14, wherein the preprocessing comprises at least one of conversion to greyscale, contrast normalization and illumination normalization.

16. The descriptor generator of claim 10, wherein the descriptor encodes textural property of the image region.

17. The descriptor generator of claim 10, wherein the base filter comprises any one of: a Gabor filter, a pillbox filter and a Laplacian of a Gaussian filter.

18. The descriptor generator of claim 10, wherein the significance is determined using a rotationally symmetric Gaussian low-pass filter of the same size as the image region.

* * * * *